Patented Jan. 8, 1952

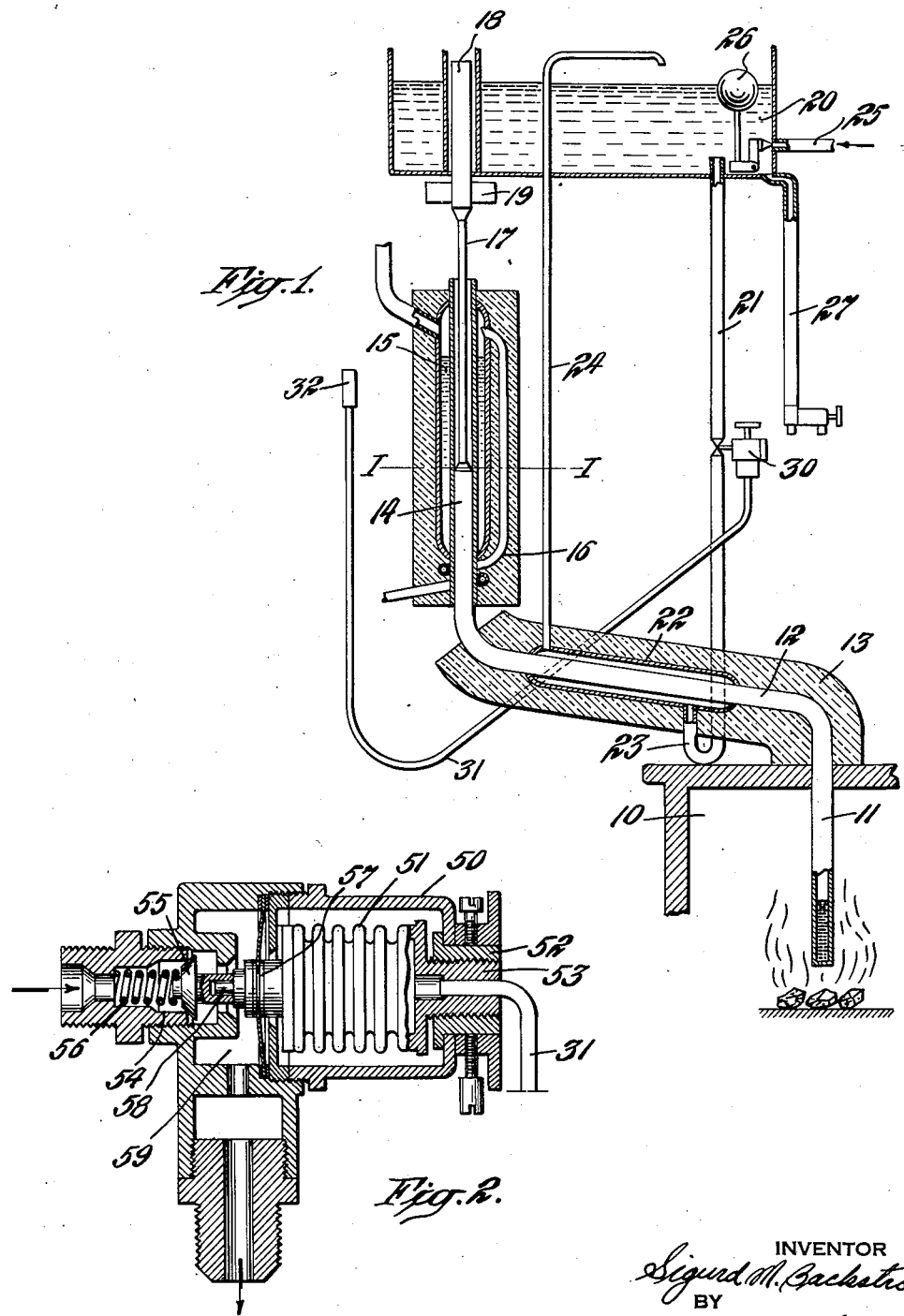

2,581,347

UNITED STATES PATENT OFFICE 2,581,347

ABSORPTION REFRIGERATION APPARATUS AND HEATING ARRANGEMENT THEREFOR

Sigurd Mattias Bäckström, Stockholm, Sweden, assignor to Aktiebolaget Elektrolux, Stockholm, Sweden, a corporation of Sweden Application August 5, 1944, Serial No. 548,221
In Sweden July 9, 1943

11 Claims. (Cl. 62—5)

The invention relates to heat transfer from a primary heat source of varying temperature, such as a long-duration cooking range, an exhaust tube, or similar heat source to an absorption refrigerating or other apparatus of similar high heating temperature by means of a hermetically closed evaporating condensing heat transfer system.

When heating such apparatus it is to be prevented that too much heat is transmitted from the primary heat source to the heated apparatus. When heating an absorption refrigerating apparatus containing an auxiliary gas and a liquid circulation gas bubble pump care must further be taken that under no circumstances so little heat is supplied to the pump that the liquid therein is slowly degasified without pumping result, because later on the apparatus would only start with difficulty.

In transferring heat from a heat source to a heat operated device with an evaporating-condensing heat transfer system, it has been exceedingly difficult to provide such heat transfer structure which makes certain that heat is given up to the heat operated device at a predetermined minimum temperature which will insure satisfactory operating conditions. One arrangement is to provide such a quantity of volatile heat transfer agent that the vaporization member boils dry when an excessively high temperature is reached. Another arrangement proposed is to instigate circulation of fluid in a new flow path when an operating condition arises due to excessive heat input. But these do not satisfy the requirement of always insuring heat input to a heat operated device at a predetermined minimum temperature which is highly desirable and imperative in many instances and particularly true in heat operated refrigeration apparatus of the kind in which circulation of absorption liquid is effected by a thermo-syphon pump. This is so because, as mentioned above, the supply of heat to the thermo-syphon pump should be effected at a sufficiently high temperature level to cause immediate pumping or lifting of liquid by vapor lift action. When the supply of heat to such a pump is at an inadequate temperature level the pump may boil dry without effecting any pumping of liquid, thereby making it difficult to start operation of the refrigeration apparatus at a subsequent time.

This invention makes use of an evaporating condensing heat transfer system containing a working medium and an inert gas. In such systems both media will not much diffuse into each other, the inert gas being compressed by the vapour clouds of the working medium.

The extent of the vapours of the working medium and the extent of the inert gas therefore vary inversely in the system according to the delivery of heat of the primary heat source to the heat transfer system.

The invention makes use of this variation to hold the heat transfer to the absorption refrigerating apparatus within the limits of normal working of the apparatus.

Furthermore, an additional cooling device, known per se, may be provided at the pipe or pipes connecting the heat absorbing and the heat delivering parts of the heat transfer system, to easily defrost the evaporator of the refrigerating apparatus and/or to regulate the temperature of the refrigerating cabinet.

The invention will in the following be more fully described with reference to the embodiment shown diagrammatically in the accompanying drawing from which the characteristic features of the invention will be seen, and of which Fig. 1 diagrammatically illustrates an emobidment of the invention for transferring heat from a heat source to refrigeration apparatus operated by heat, and Fig. 2 is a sectional view of details shown in Fig. 1.

In Fig. 1, 10 designates a source of heat such as a long-duration cooking range. 11 designates the heat-receiving part of an hermetically closed evaporating and condensing system the middle part 12 of which is built into a heat insulation 13. The condensing part 14 of the system is arranged in heat-conducting relation with the boiler 15 of an absorption refrigerating apparatus of a well known type which operates with an inert gas.

The boiler 15 is more or less diagrammatically shown and forms the heat receiving part of an absorption refrigeration system like that shown and described in United States Letters Patent No. 1,609,334 to B. C. Von Platen and C. G. Munters. Such a boiler or heat receiving part 15 forms part of an absorption solution circuit which also includes a thermo-syphon pump 16 having a looped coil arranged to receive heat from the heat transfer system. Absorption solution flowing into the lower end of the pump coil 16 is heated and vaporized and, due to such heating, solution is raised by vapor-liquid lift action through the pump pipe to the upper part of the boiler 15. Refrigerant vapor is expelled from solution in the boiler 15 and flows from the upper part thereof to a condenser, not shown. Solution from which refrigerant has been expelled flows from the boiler 15 to an absorber (not shown), such circulation of solution being effected by raising of liquid by vapor-liquid lift action. In order to simplify the drawing the absorption solution circuit has not been illustrated in its entirety since it is not necessary for an understanding of this invention.

From the upper end of the condenser part 14 extends a conduit 17 with less area than the parts 11, 12 and 14, said conduit being connected above to a secondary heat-delivering part 18 fulfilling certain requirements which will be stated below. The system is, as has already been mentioned, hermetically closed and contains a certain quantity of a chemically indifferent transfer medium of high boiling point the vapour of which has great density. These requirements are fulfilled to a very large extent by mercury. According to the invention, the system also contains an inert gas, such as nitrogen, argon or the like. Before filling, the system is carefully evacuated whereupon the inert gas is introduced up to a pressure of about 13 mm. mercury corresponding to about 0.017 atmospheric pressure. Under these conditions the mercury begins to boil at about 190° C. The mercury vapour displaces the nitrogen gas and forms a heavy cloud in the lower part of the system. This will cause the pressure of the nitrogen gas to increase somewhat, the boiling temperature of the mercury thus also rising. The upper edge of the vapour cloud will rise farther and farther upward, according as more heat is supplied to the system. When the cloud has reached the lower edge of the condenser part 14, its temperature is about 220° C., because the nitrogen gas has, owing to a careful choice of the volume of the system, been compressed to a pressure of about 0.04 atmospheric pressure. Before any appreciable quantities of heat are transferred to the boiler of the refrigerating apparatus, the temperature of the condenser part 14 will remain below the value at which damage may be done to the refrigerating apparatus. This sharp delimitation of the temperature is due to the well defined cloud-formation, there being no appreciable mixing of the inert gas with mercury vapour. The upper boundary of the condensing area will therefore always remain sharp. When the mercury cloud has passed through the lower part of the condenser part 14 and reached the level I, the pressure will be about 0.055 atmospheric pressure and the temperature about 230° C. An additional increase in the heat supply to the boiler part 11 of the transfer system will cause the upper edge of the vapour cloud to be displaced upwardly, the inert gas being still further compressed. When the vapour cloud has reached the container 18, the temperature in the heat-delivering part 14 will have risen to about 260° C. if the volume of the system has been so dimensioned that the nitrogen gas compressed in the upper part of the container 18 has a pressure of about 0.13 atmospheric pressure. There is no difficulty in so dimensioning the system relatively to the source of heat that the temperature of part 14 will be kept within narrow limits (in this case 220–260° C.) by the container 18, which is cooled by means of cooling fins 19 or in some other manner. It is to be observed that this cooling may be wholly continuous, no appreciable quantities of heat being withdrawn from the system through said cooling members until the vapour cloud has reached the vicinity of container 18. The fall of temperature between the vapour cloud and the inert gas is extremely great, so that a temperature gradient of about 10° to 20° C. per cm. may be observed along the iron tube.

The heat transfer system 11, 12, 14, 17, 18 thus fulfills all the demands that must be made on a source of heat for an absorption refrigerating apparatus, the heat-delivering part 14 continuously exhibiting temperatures which are either sufficient for normal working or too low for causing any damage to the absorption refrigerating apparatus. In certain small refrigerating apparatus a heat transfer system of this kind is wholly satisfactory, as in those cases where no regulation of the temperature in the refrigerator cabinet nor defrosting of the evaporator are required. In those cases where such demands are made it is possible to use known methods, such as heat supply to the cabinet, for effecting those occasional rises in temperature in the refrigerator cabinet which are required for the regulation of the temperature or for defrosting the evaporator. It is, however, generally preferable to provide the transfer system proper with regulating members which afford decrease of temperature in the heat-delivering part 14. For this purpose there is arranged in the embodiment according to Fig. 1 a water tank 20 from which water, through a conduit 21, is supplied to a cooling jacket 22 which surrounds or is arranged in some other manner in heat-conducting relation with part 12 of the heat-transfer system. The conduit 21 is connected to the lower part of the cooling jacket by way of a U-tube 23. From the higher end of the jacket 22 extends a pump and vapour conduit 24 the upper end of which is located above the water level in the vessel 20, though, in certain cases, it may advantageously communicate with the bottom of said vessel. The liquid level in the vessel 20 is maintained by the vessel being connected to a hydraulic conduit 25, from which the water supply is regulated by a float valve 26 of a kind known per se. From the vessel water may be tapped off through a water conduit 27. The container 20 may be arranged as a geyser and, if desired, stand under the same pressure as the water in conduit 25; in which case it must obviously be closed. The water in the cooling jacket 22 is brought into thermal relation with the vapor cloud in conduit 12 to abstract heat therefrom and cause expulsion of vapor from the cooling water, such expelled vapours being effective to pump up the liquid through the conduit 24, thus keeping a water circulation through the cooling jacket. It offers no difficulties to dimension this circulating system in such a manner that the vapour cloud in the heat transfer system is lowered from the heat-delivering part 14 to a lower located point, thus interrupting the heat supply to the boiler of the refrigerating apparatus. For regulating the liquid circulation through the systems 21, 22, 24 and thus regulating the temperature in the condenser part 14 a valve 30, which may be hand-operated or thermostatically controlled, is arranged in the conduit 21. In the latter case it receives through an impulse conduit 31 and a feeler body 32 of a kind known per se impulses from a suitable part of the refrigerating apparatus, preferably the evaporator, not shown. When the temperature of the evaporator sinks, the valve 30 is automatically opened, the continued generation of cold being thus interrupted or reduced. The upper part 18 of the heat transfer system is preferably built into the water container 20, so that, when much heat is supplied to the transfer system, that is when the vapour cloud reaches said part, the excess of heat is transferred to the contents in the container 20.

The valve 30 may preferably be of the known kind in which the movements of the valve body are determined by a spring-loaded bellows. Fig. . shows diagrammatically a section of such a va've. As such valves are well-known, a detailed description of the function of the valve will no doubt be unnecessary. The valve box is designated by 50. The bellows communicating with the feeler body 32 is designated by 51; the operating drum 52 by means of which the zero position of the valve is adjusted is pivotally journalled in the valve box 50 and threaded on to the joint part 53 of the thermostat conduit 31 in such a manner that said part is displaced axially upon rotation of the drum 52. The valve seat is designated by 54 and the valve body by 55. The latter is, by a spring 56, kept pressed against the end plate 57 of the bellows 51 which must thus work against the spring pressure. When the pressure in the bellows 51 is reduced owing to the sinking temperature in the evaporator arranged in heat-conducting relation with the feeler body 32, the valve is opened and the water flows in the direction of the arrow from the part of the conduit 21 located above the valve to its part located below the valve and thence farther to the cooling jacket 22 (Fig. 1). The valve body 55 is journalled around a pin 58 on the end-plate of the bellows in such a manner that it can be displaced axially relatively to the plate. This will cause the valve to function also as a check valve, this being of advantage in the case of sudden shocks in the tube jacket 22, which shocks are propagated upwards through the lower part of the conduit 21. An increase in pressure in the chamber 59 will momentarily close the valve, the vapour being thus no longer pressed through the upper part of the conduit 21 up into the water tank 20.

The invention is not limited to the embodiment shown diagrammatically, but may be varied in several ways without departing from the spirit of the invention. This relates to the choice of transfer medium and inert gas in the transfer system as well as the form of the latter. It is also obvious that the transfer system must consist of a material which is resistant to the working media enclosed in the system. If mercury is used, the system should preferably be made of iron nor aluminium. In certain cases the inner surfaces of the system should be prepared in a special manner, that is, such as, for example, chromed or coated with a layer of stainless steel or the like. A bright surface is advantageous for the reason that no foreign matter can be detached from the walls and thus contaminate the mercury. Contaminated mercury has an unfavourable tendency to form coatings on the walls, an increasingly larger amount of the original quantity of mercury being thus withdrawn from the cycle. Such accumulations may also cause injurious restrictions in the vapour paths. Before the system is filled, the wall material should, moreover, always be carefully evacuated of hydrogen gas, as by heating and simultaneous evacuation, as otherwise this hydrogen gas may, at the temperatures to which the system is subjected during operation, escape from the wall material, thus increasing the pressure of the inert gas and consequently also the boiling temperature of the mercury. As regards the quantity of transfer medium it may be mentioned that this quantity, in contradistinction to what is the case in the majority of previously known transfer systems with automatic limitation of the temperature, may be relatively arbitrary. It is, however, advantageous to fill in so much mercury in relation to the volume of the system that, in the cold state, a column of mercury of about 150 mm. will be found at the bottom of the system. This will make the boiling more regular and prevent the Leidenfrost phenomenon which may otherwise easily occur in the boiling of mercury.

As regards the regulating system 20, 21, 22, 24 it may be pointed out that, under certain conditions, particularly when the difference of height between the jacket 22 and the tank 20 is great, use may advantageously be made of a simple hot-water system without any generation of vapour, the circulation being effected in a manner analogous to that used in central heating installations.

I claim:

1. Absorption refrigeration apparatus including a vapor expulsion unit containing absorption solution from which refrigerant vapor is expelled by heating, structure for transferring heat to such vapor expulsion unit from a source of heat of varying temperature comprising an hermetically closed circuit containing an inert gas and a vaporizable fluid having a relatively high boiling point whose vapor is substantially immiscible with the gas, said circuit including a vaporizing element associated with said heat source for vaporizing fluid therein by heat derived from the latter, a condensing element in thermal exchange relation with said vapor expulsion unit and in which such vaporized fluid condenses to transfer heat to absorption solution in such unit, a member for delivering vaporized fluid from said vaporizing element to said condensing element, said circuit having an internal gas pressure to effect initial boiling of said fluid at a temperature of at least 100° C. or higher and continued boiling thereof at increasingly higher temperatures to cause the vaporized fluid produced by such boiling to displace inert gas in said circuit, the delivery member being of such cross-sectional dimension throughout its length that, irrespective of the rate at which the vaporized fluid is formed and moves through said delivery member, a more or less definite boundary is established between the inert gas and vaporized fluid formed due to such heating which advances in said delivery member from said vaporizing element toward said condensing element and always reaches said condensing element to transfer heat to said vapor expulsion unit to effect operation of the refrigeration apparatus only at a predetermined minimum temperature at which condensation of vaporized fluid takes place in said condensing element.

2. Structure as set forth in claim 1 in which the vaporizable fluid comprises a heat transfer medium whose vapor is of substantially greater density than that of the inert gas.

3. Structure as set forth in claim 1 in which the vaporizable fluid is mercury.

4. Structure as set forth in claim 1 in which the inert gas comprises argon and the vaporizable fluid comprises a heat transfer medium whose vapor is of substantially greater density than that of argon.

5. Structure as set forth in claim 1 in which the inert gas comprises nitrogen and the vaporizable fluid comprises a heat transfer medium whose vapor is of substantially greater density than that of nitrogen.

6. Structure as set forth in claim 1 in which the vaporizable fluid is mercury and the inert gas comprises argon.

7. Structure as set forth in claim 1 in which the vaporizable fluid is mercury and the inert gas comprises nitrogen.

8. Absorption refrigeration apparatus including a vapor expulsion unit containing absorption solution from which refrigerant is expelled by heating, structure for transferring heat from a source of heat of varying temperature to said vapor expulsion unit comprising an hermetically closed circuit which is at a partial vacuum and contains an inert gas and a vaporizable fluid, said circuit including a vaporizing element associated with said heat source for vaporizing fluid therein by heat derived from the latter and a condensing element in thermal exchange relation with said vapor expulsion unit, said condensing element being connected at one end thereof to receive vaporized fluid from said vaporizing element which condenses therein to transfer heat to said vapor expulsion unit, and a member for collecting inert gas which is connected to the opposite end of said condensing element and into which vaporized fluid passes upon a definite increase in vapor pressure in said circuit, said member during normal operation of the refrigeration apparatus being disposed in thermal exchange relation with a medium at a lower temperature than that at which refrigerant vapor is expelled from solution in said vapor expulsion unit.

9. Structure as set forth in claim 8 in which said collecting member in its entirety is disposed above said condensing element and out of thermal exchange relation with the latter and a conduit connects said member and the upper end of said condensing element, the lower end of said condensing element being connected to receive vaporized fluid from said vaporizing element.

10. Absorption refrigeration apparatus comprising a vapor expulsion unit containing absorption solution from which refrigerant vapor is expelled by heating and including a liquid pump operable by vapor lift action, and structure for transmitting heat to such pump from a source of heat of varying temperature comprising an hermetically closed circuit containing an inert gas and a vaporizable fluid having a relatively high boiling point whose vapor is substantially immiscible with the gas, said circuit including a vaporizing element associated with the heat source for vaporizing fluid therein by heat derived from the latter, a condensing element in thermal exchange relation with said liquid pump and in which such vaporized fluid condenses to transfer heat to absorption solution in such pump, a member for delivering vaporized fluid from said vaporizing element to said condensing element, said circuit having an internal gas pressure to effect initial boiling of said fluid at a temperature of at least 100° C. or higher and continued boiling thereof at increasingly higher temperatures to cause the vaporized fluid produced by such boiling to displace inert gas in said circuit, the delivery member being of such cross-sectional dimension throughout its length that, irrespective of the rate at which the vaporized fluid is formed and moves through said delivery member, a more or less definite boundary is established between the inert gas and vaporized fluid formed due to such heating which advances in said delivery member from said vaporizing element toward said condensing element and always reaches said condensing element to transfer heat to absorption solution in said pump to effect operation thereof by vapor lift action only at a predetermined minimum temperature at which condensation of vaporized fluid takes place in said condensing element.

11. Absorption refrigeration apparatus comprising a vapor expulsion unit containing absorption solution from which refrigerant vapor is expelled by heating and including a liquid pump operable by vapor lift action, and structure for transmitting heat to such pump from a source of heat of varying temperature comprising an hermetically closed circuit which is at a partial vacuum and contains mercury and an inert gas substantially immiscible with mercury vapor, said circuit including a vaporizing element associated with the heat source for vaporizing fluid therein by heat derived from the latter, and a condensing element which is in thermal exchange relation with said pump and connected to receive vaporized fluid from said vaporizing element, such vaporized fluid condensing in said condensing element to transfer heat to absorption solution in said pump to expel refrigerant vapor from solution therein and effect operation of said pump by vapor lift action.

SIGURD MATTIAS BÄCKSTRÖM.

REFERENCES CITED

The following references are of record in the file of this patent:

UNITED STATES PATENTS

| Number | Name | Date |
| --- | --- | --- |
| 1,064,037 | Whitney | June 10, 1913 |
| 1,714,812 | Pew, Jr., et al. | May 28, 1929 |
| 1,734,329 | Field | Nov. 5, 1929 |
| 1,744,968 | Keith | Jan. 28, 1930 |
| 1,794,448 | Derby | Mar. 3, 1931 |
| 1,810,912 | Field | June 23, 1931 |
| 1,886,436 | Wait | Nov. 8, 1932 |
| 2,116,389 | Fiene | May 3, 1938 |
| 2,142,828 | Smith | Jan. 3, 1939 |
| 2,269,099 | Grubb | Jan. 6, 1942 |
| 2,269,100 | Kohler | Jan. 6, 1942 |
| 2,269,101 | Grubb et al. | Jan. 6, 1942 |
| 2,311,711 | Thomas | Feb. 23, 1943 |
| 2,402,415 | Kogel | June 18, 1946 |

FOREIGN PATENTS

| Number | Country | Date |
| --- | --- | --- |
| 442,586 | Great Britain | Feb. 7, 1936 |